United States Patent Office 3,247,261
Patented Apr. 19, 1966

3,247,261
ORGANO-METALLO COMPOUNDS
Gaetano F. D'Alelio, South Bend, Ind., assignor, by direct and mesne assignments, to Dal Mon Research Co., Cleveland, Ohio, a corporation of Delaware
No Drawing. Filed Dec. 24, 1958, Ser. No. 782,643
2 Claims. (Cl. 260—615)

This invention relates to ether compounds containing aluminum, beryllium, or magnesium. More specifically, it pertains to the preparation of such compounds by the addition of the corresponding metal hydrides or their hydrocarbon derivatives to unsaturated ethers.

In accordance with the practice of this invention, new compounds are prepared which contain both metal and ether groups therein. These compounds can be used as catalysts for various types of addition reactions, as high energy fuels, and as intermediates in the preparation of organo-metal polymers, and some as monomers for copolymerization with other polymerizable vinyl and vinylidene monomers, and for grafting to polymers of various types.

The compounds of this invention are prepared by the addition of aluminum, beryllium, or magnesium hydrides, or their hydrocarbon derivatives, sometimes hereinafter referred to generally as "metal hydride compounds," with ether compounds having ethylenic unsaturation therein, such compounds being hereinafter referred to sometimes as "alkenyl compounds." The resultant products containing both metal and ether groups are sometimes hereinafter referred to as "metal-organo products."

Typical aluminum hydride compounds that can be used in the practice of this invention include, but are not limited to, the following: aluminum hydride ($AlH_3$), including its various polymeric forms $(AlH_3)_x$, aluminum alkyl dihydrides, aluminum dialkyl hydrides, aluminum trialkyls, various hydrocarbon derivatives of polymeric aluminum hydrides, etc. These can be used as such, or in complex form with alkali metal hydrides, such as lithium hydrides and sodium hydrides, alkali metal alkyls, ethers, thioethers, tertiary amines, etc.

Specific examples of such compounds include, but are not restricted to, the following: dimethyl aluminum hydride, diethyl aluminum hydride, dipropyl aluminum hydride, dibutyl aluminum hydride, dipentyl aluminum hydride, diphenethyl aluminum hydride, dicyclohexyl aluminum hydride, methyl aluminum dihydride, ethyl aluminum dihydride, propyl aluminum dihydride, butyl aluminum dihydride, pentyl aluminum dihydride, phenethyl aluminum dihydride, 2-ethyl-hexyl aluminum dihydride, cyclohexyl aluminum dihydride, cyclopentyl aluminum dihydride, cyclohexylethyl aluminum dihydride, cyclopentylethyl aluminum dihydride, trimethyl aluminum, triethyl aluminum, tripropyl aluminum, tributyl aluminum, triisobutyl aluminum, tripentyl aluminum, tri-(2-ethylhexyl)aluminum, tri-phenethyl aluminum, tri-benzyl aluminum, tri-(2-decyl-tetradecyl)aluminum, triphenyl aluminum, tritolyl aluminum, tetramethyl dialuane, trimethyl dialuane, pentamethyl dialuane, symmetrical diethyl dialuane, tetraethyl dialuane, pentaethyl dialuane, etc.

Typical examples of the hydrides and hydrocarbon substituted hydrides of beryllium which can be used in the practice of this invention include, but are not limited to, the following: beryllium hydride, beryllium alkyl hydrides, such as methyl beryllium hydride, ethyl beryllium hydride, propyl beryllium hydride, butyl beryllium hydride, octyl beryllium hydride, nonyl beryllium hydride, styryl beryllium hydride, cyclohexyl beryllium hydride, phenyl beryllium hydride, dimethyl beryllium, diethyl beryllium, methyl ethyl beryllium, dipropyl beryllium, dibutyl beryllium, ethyl butyl beryllium, diamyl beryllium, dioctyl beryllium, distyryl beryllium, methyl phenyl beryllium, dicyclohexyl beryllium, ethyl cyclohexyl beryllium, dicyclopentyl beryllium, etc.

Typical examples of the hydrides and hydrocarbon substituted hydrides of magnesium which can be used in the practice of this invention include, but are not limited to, the following: magnesium hydride, magnesium alkyl hydrides, such as methyl magnesium hydride, ethyl magnesium hydride, propyl magnesium hydride, butyl magnesium hydride, octyl magnesium hydride, nonyl magnesium hydride, styryl magnesium hydride, cyclohexyl magnesium hydride, phenyl magnesium hydride, dimethyl magnesium, diethyl magnesium, methyl ethyl magnesium, dipropyl magnesium, dibutyl magnesium, ethyl butyl magnesium, diamyl magnesium, dioctyl magnesium, distyryl magnesium, methyl phenyl magnesium, dicyclohexyl magnesium, ethyl cyclohexyl magnesium, dicyclopentyl magnesium, etc.

These metal hydride compounds can be used as such, or in various complex forms, such as complexes with ethers, tertiary amines, thioethers, etc.

Typical examples of various other compounds having ethylenic unsaturation therein that can be used in the practice of this invention include, but are not restricted to, the following: vinyl ethyl ether, vinyl butyl ether, vinyl propyl ether, vinyl amyl ether, vinyl cyclohexyl ether, vinyl phenyl ether, vinyl tolyl ether, isopropenyl methyl ether, isopropenyl isopropyl ether, isopropenyl butyl ether, isopropenyl phenyl ether, isopropenyl amyl ether, isobutenyl ethyl ether, allyl methyl ether, allyl ethyl ether, allyl propyl ether, butenyl ethyl ether, butenyl propyl ether, pentenyl amyl ether, vinyl cyclohexyl ether, vinyl cyclopentyl ether, para-vinyl anisole, allyl benzyl ether, vinyl benzyl ether, vinyl phenethyl ether, isopropenyl phenethyl ether, divinyl ether, diallyl ether, vinyl allyl ether, propenyl vinyl ether, propenyl allyl ether, divinyl ether of resorcinol, divinyl ether of ethylene glycol, diisopropenyl ether, isopropenyl allyl ether, isopropenyl butenyl ether, isopropenyl isoamylene ether, diallyl ether of resorcinol, diisobutenyl ether of hydroquinone, para-vinyloxy styrene, para allyloxy styrene, triallyloxy benzene, tripropenyloxy benzene, 2-methoxy-butadiene-1,3, 2-ethoxy-butadiene-1,3, 2-phenoxy-butadiene-1,3, furane, 4,4'-divinyl-diphenyl-ether, 4,4'-divinyloxy-diphenyl, 4,4'-divinyl dicyclohexyl ether, vinyloxy cyclohexene, 4-vinyloxy vinyl cyclohexane, divinyloxy cyclohexane, divinyloxy cyclopentane, diallyloxy cyclohexane, 4-allyloxy-vinylcyclohexane, 3-ethoxy divinyl cyclohexane, dicyclohexenyloxy-benzene, p-cyclohexenyloxy-styrene, 4,4'-divinyl diphenyloxide, etc.

When monoalkenyl ether compounds are used in the practice of this invention, the desired molar proportions of ether to metal hydride compounds is determined mainly by the number of groups to be substituted on the metal. For example, if each of the valencies of the metal is to be satisfied by the ether compound, then any excess amount of alkenyl compound can be used. However, when less than complete substitution of the metal atom is to be made by the alkenyl compound, then the proportion of alkenyl compound to metal hydride compound is controlled so as to favor the degree of substitution desired. For example, if only one ether group is to be substituted, then the metal hydride compound should be used in excess to retard the formation of metal-organo products having a plurality of the ether substituents. However, the desirability of separating the desired product from either unreacted starting material, or from more highly substituted byproducts will dictate the molar proportions which will give a more favorable yield of the desired product. In other cases, where a mixture of mono-, di-, and tri-substituted derivatives are desired, the mixture can be prepared directly by adjusting the ratio of the alkenyl compound to the metal compound.

When the alkenyl compound has a plurality of ethylenically unsaturated groups therein, it is desirable to use an excess of the alkenyl compound so as to suppress byproduct polymer formation. When the metallo-organo product is to have only one substituent added thereon, a considerable excess of the alkenyl compound can be employed to suppress both polysubstitution and polymer formation. However, when all of the valencies of the metal atom are to be satisfied by the alkenyl compound having a plurality of ethylenically unsaturated groups, a compromise must be made so that the conditions permit the formation of byproducts having lower degrees of substitution on the metal atom as well as the polymeric byproducts. Very often the preparation of metallo-organic products, fully substituted by the alkenyl compound, is favored by the use of an inert diluent which retards byproduct polymer formation, thereby permitting a higher yield of the fully substituted metal-organo product.

High temperatures and prolonged reaction periods favor the production of byproduct polymers. Optimum reaction times and temperatures will vary according to the particular reactants. The yield of desired products will also vary in accordance with the reaction conditions, namely the proportions of material used, temperature, reaction time, etc. In order to suppress byproduct polymer formation, it is also desirable to distill the products under reduced pressures at as low a temperature as possible and as quickly as possible.

When metal hydrides themselves are used in the practice of this invention, it is generally difficult to interrupt the reactions to give substitution of lower degree than full substitution. When it is desired to introduce a lower number of such groups, it is generally desirable to use a metal hydride compound having the same number of hydrogen atoms thereon as correspond to the number of substituent groups desired, or the metal hydride compound can be one fully substituted with hydrocarbon groups and by controlling concentrations and reaction conditions, these hydrocarbon groups can be replaced to the desired degree by the proper number of substituent groups.

The optimum reaction temperature depends somewhat on the nature of the metal hydride compound as well as the alkenyl compound. With the hydrides themselves, the reaction proceeds rapidly at a temperature from room temperature up to 50° C. or 60° C., depending on the type of ethylenic group in the alkenyl compound. Vinyl and vinylidene groups react readily at room temperature. The reaction proceeds most rapidly with vinyl and vinylidene types of compounds, and requires longer reaction periods or higher temperatures with ethylenic groups which have substituents on both carbon atoms. In some cases, it is desirable to have the temperature below room temperature and to use longer reaction periods so as to control the type and degree of addition. This is particularly true when the alkenyl compound is a polyunsaturated compound. The lower temperatures in such cases suppress the formation of byproduct polymers. When the metal hydride compound is partially substituted with hydrocarbon groups, reaction temperatures in the range of 40° C.–60° C. are generally suitable, depending on the degree of substitution desired and the type and number of ethylenic groups present in the alkenyl compound. If only the hydrogen in such hydride compound is to be reacted, a lower temperature is desirably maintained to prevent simultaneous or subsequent replacement of the hydrocarbon groups, which generally form the corresponding olefin or unsaturated compound as a byproduct. Also, if the alkenyl compound is a polyunsaturated compound, then the lower temperatures are preferably used to retard byproduct polymer formation.

The use of higher temperatures favors the replacement of hydrocarbon groups, particularly where the hydrocarbon groups are to be completely replaced by the alkenyl compounds. However, when the alkenyl compound is a polyunsaturated one, such higher temperatures also favor byproduct polymer formation. It is desirable, therefore, to use longer reaction times with lower temperatures and appropriate concentrations to favor substitution without byproduct polymer formation. In such cases, the use of inert diluents is also advantageous.

The products obtained by the practice of this invention can be represented by the formula $$X_nM-CR_2-Z-R'$$

wherein X is R' or another $-CR_2-Z-R'$ group, R is hydrogen or a hydrocarbon group, R' is a hydrocarbon group, M represents the metal atom, $n$ has a value of 2 when the metal has a valency of 3, and a value of 1 when the metal has a valency of 2, and Z is an ether oxygen or a divalent group having at least one hydrocarbon portion and at least one ether oxygen therein. The latter ether oxygen can be between the two valencies or can be on a side chain off a hydrocarbon portion. The R, R', and Z groups include hydrocarbon groups which can be connected to another of said groups to form a cyclic group.

When the ether starting material is a monoalkenyl compound, the resulting metal derivative has no ethylenic unsaturation therein, and, therefore, in such cases, X, R, Z, and R' are all saturated in the hydrocarbon portions thereof. Such products can be represented by $$X''_nM-CR'''_2-Z''-R''$$

in which X'' represents R'' or another $-CR'''_2-Z''-R''$ group, R'' is a saturated hydrocarbon group, and R''' is hydrogen or a saturated hydrocarbon group, and Z'' corresponds to Z, except that there can be no ethylenic unsaturation therein.

The monoalkenyl starting materials can be represented by the formula $$CR'''_2=\overset{R'''}{\underset{|}{C}}-Z''-R''$$

in which R''', Z'', and R'' are as defined above. The hydrocarbon groups of R''', Z'', and R'' can have substituents attached thereto which are nonreactive with the metal reagents. The various R'' and R''' groups can also be polyvalent hydrocarbon groups, which are also connected with a Z'', R'', or R''' group to form a cyclic group.

Upon reaction with metal hydride compounds, which can be represented as $MR'''_{n+1}$, with R''' as defined above, the reaction can be represented as $$CR'''_2=CR'''Z''R'' + MR'''_{n+1} \longrightarrow$$

$$MR'''_n-\left[\underset{|}{\overset{|}{C}}R'''_2CR-Z''R''\right]-H$$

When the ether starting material or alkenyl compound has a plurality of ethylenically unsaturated groups therein, metal-organo products can be obtained having ethylenic unsaturation, which lends itself to further reactions or to addition polymerization catalyzed by free radicals, such as generated by diazo compounds, such as, for example, those disclosed in U.S. Patent No. 2,471,959, by ionizing radiation, and by heterogeneous surface catalysts, to give polymeric compositions having high proportions of metal therein. These polymer products are suitable for use as propellant fuel for rockets, missiles, and related devices.

The polyunsaturated starting material can be represented by the formula $$CR_2=CR-Z-CR=CR_2$$

wherein R and Z are as defined above. Other substituents can also be attached to the hydrocarbon groups of R and Z provided they are not reactive with the metal reagent. However, additional alkenyl groups can be attached directly or indirectly to such hydrocarbon groups so as to have three or more ethylenically unsaturated groups in the starting compound.

As indicated hereinafter, the addition of the metal hydride compound can give an ether compound having a plurality of metal substitutions in the starting compound, or can be controlled to limit the number of metal additions to a number less than the number of ethylenic groups in the starting material and thereby produce a product having ethylenic unsaturation therein, which can be subsequently reacted by addition of other materials or by addition polymerization. The products obtained by the addition of metal hydride compounds to such polyalkenyl starting materials are represented by the following reactions I, II, III, and IV, in which I illustrates the addition of aluminum to two of the ethylenic groups in one molecule of the polyalkenyl compound; II illustrates the addition of aluminum to only one of the ethylenic groups; III illustrates the addition of an aluminum atom to one ethylenic group in each of two molecules of the polyalkenyl compound; and IV illustrates the addition of an aluminum atom to one ethylenic group in each of three molecules of the polyalkenyl compound. Reactions of corresponding magnesium and beryllium compounds follow the reactions of I, II, and III, with appropriate changes for the divalent metal compounds.

(I)
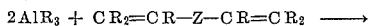
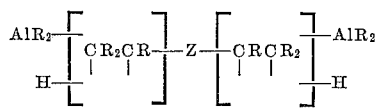

(II)
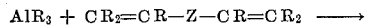
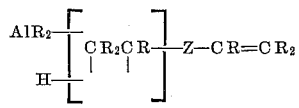

(III)
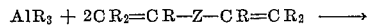
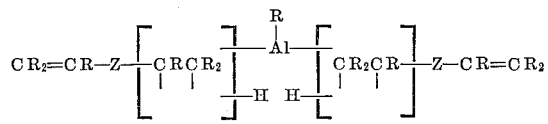

(IV)
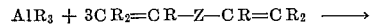
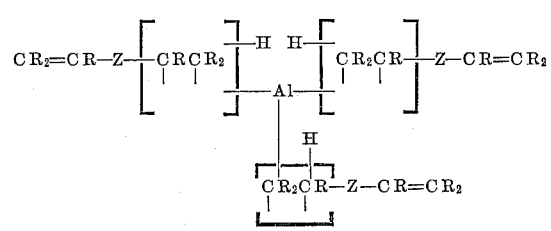

In the above reactions, reaction I is favored by the use of disubstituted aluminum hydride, the use of little excess polyalkenyl compound over the stoichiometric amount indicated in the reaction, and the use of temperatures favoring hydrogen reaction, but not displacement of hydrocarbon groups.

Reaction II is favored by the use of di-substituted aluminum hydrides, an excess of 3 moles or more of polyalkenyl compound per mole of aluminum hydride over that indicated as participating in the reaction, and the use of temperatures favoring hydrogen reaction but not displacement of hydrocarbon groups. Prolonged reaction periods should also be avoided, and distillations to remove unreacted polyalkenyl compound, or to fractionate the desired product should be performed as quickly and at as low a temperature as possible.

Reaction III is favored by the use of mono-substituted aluminum hydrides, high concentrations of polyalkenyl compound (advantageously 4 moles or more in excess of the 2 moles indicated as reacting per mole of $AlR_3$), and the use of temperatures favoring hydrogen reaction but not displacement of R groups. Again prolonged reaction periods should be avoided, and any distillation to be performed should be as rapid and at as low a temperature as possible.

Reaction IV is favored by the use of an aluminum hydride, by considerable excess of polyalkenyl compound, advantageously in excess of 6 moles or more of polyalkenyl compound per mole of aluminum hydride, and the use of temperatures favoring hydrogen reaction but not displacement of hydrocarbon groups. Again prolonged reaction periods, high distillation temperatures, and prolonged distillations should be avoided.

While the foregoing conditions are indicated as favorable toward the production of the particular products indicated, such products can be obtained under conditions other than those indicated. In such cases, however, the byproduct production of more highly substituted products or polymers is generally increased. Furthermore, the fully substituted aluminum hydrides can also be used to produce such products. For example, the reaction of a fully substituted aluminum hydride with a polyalkenyl compound at a temperature favorable to replacement of the hydrocarbon groups is stopped or retarded after a comparatively short reaction period by lowering the temperature so as to obtain a reaction mixture containing products having various degrees of substitution of the aluminum hydride. Then by the application of reduced pressures, the products can be fractionated at relatively low temperatures which do not favor further reaction or substitution. In the reactions using unsubstituted or partially substituted aluminum hydrides, it is also advantageous, when the reaction has proceeded to the desired degree, to stop or retard further reaction by reducing the temperature.

The above reactions I, II, and III, for the corresponding compounds of the divalent metals beryllium and magnesium, are as follows:

(Ia)
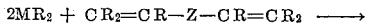
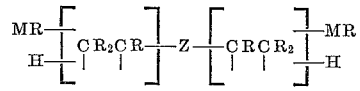

(IIa)
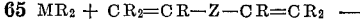
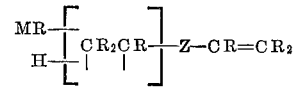

(IIIa)
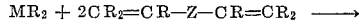
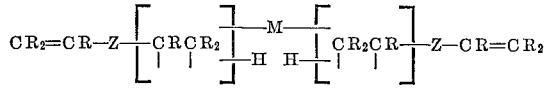

In these reactions, Reaction Ia is favored by the use of mono-substituted beryllium and magnesium hydride, the use of little excess polyakenyl compound over the stoichiometric amount indicated in the reaction, and the use of temperatures favoring hydrogen reaction, but not displacement of hydrocarbon groups.

Reaction IIa is favored by the use of mono-substituted beryllium and magnesium hydrides, an excess of 3 moles or more of polyalkenyl compound per mole of metal hydride compound over that indicated as participating in the reaction, and the use of temperatures favoring hydrogen reaction but not displacement of hydrocarbon groups. Prolonged reaction periods should also be avoided, and distillations to remove unreacted polyalkenyl compound, or to fractionate the desired product should be performed as quickly and at as low a temperature as possible.

Reaction IIIa is favored by the use of a metal hydride, by considerable excess of polyalkenyl compound, advantageously in excess of 6 moles or more of polyalkenyl compound per mole of borane, and the use of temperatures favoring hydrogen reaction but not displacement of hydrocarbon groups. Again prolonged reaction periods, high distillation temperatures, and prolonged distillations should be avoided.

While the foregoing conditions are indicated as favorable toward the production of the particular products indicated, such products can also be obtained under conditions other than those indicated. In such cases, however, the byproduct production of more highly substituted products or polymers is generally increased. Furthermore, the fully substituted beryllium and magnesium hydride compounds can also be used to produce such products. For example, the reaction of a fully substituted metal hydride compound with a polyalkenyl compound at a temperature favorable to replacement of the hydrocarbon groups is stopped or retarded after a comparatively short reaction period by lowering the temperature so as to obtain a reaction mixture containing products having mono-substitution of the metal hydride compounds. Then, by application of reduced pressures, the products can be fractionated at relatively low temperatures which do not favor further reaction or substitution. In the reactions using unsubstituted or partially substituted metal hydride compounds, it is also advantageous, when the reaction has proceeded to the desired degree, to stop or retard further reaction by reducing the temperature and then applying reduced pressures to recover the product at temperatures advantageously below those at which the reaction occurs.

In the above reactions, the products have been represented by formulas which do not indicate the exact point of attachment of the metal atoms. The exact location of the metal depends on the type and size of the groups attached to the ethylenic carbon atoms. When the ethylenic group is a vinyl or vinylidene group, the metal is preferentially attached to the terminal carbon atom. However, when one or both of the R groups attached to that carbon atom is an alkyl group, the affinity of the metal for that carbon may be reduced to a degree where the metal affinity for the other carbon atom of the ethylenic group is equal to or less than that for the first carbon. This is particularly so when the single R of the other carbon atom is hydrogen and one or both of the R groups on the first carbon is a large hydrocarbon group. Therefore, the metal atom may become attached to the second carbon atom instead of the first.

Various methods of practicing the invention are illustrated by the following examples. These examples are intended merely to illustrate the invention and not in any sense to limit the manner in which the invention can be practiced. The parts and percentages recited therein, and also in the specification, unless specifically provided otherwise, refer to parts by weight and percentages by weight. Unless indicated otherwise, the terms "polymer" and "polymeric" are intended to include "copolymers" and "copolymeric."

EXAMPLE I

Aluminum hydride (30 parts) is suspended in 200 parts of hexane and maintained under a nitrogen atmosphere and at room temperature. Vinyl ethyl ether (216 parts) is added dropwise with stirring and under nitrogen atmosphere, at such a rate that the temperature of the reaction mixture does not rise more than 5°. Stirring is continued for 30 minutes after all the hydride has been added and then the reaction mixture refluxed for an additional 30 minutes. Then the temperature is gradually raised above the boiling point of the hexane in order to remove unreacted ether and hexane. When it appears that hexane is no longer being removed, the reaction mixture is cooled under nitrogen atmosphere to room temperature and weighed. 217.2 parts of product are obtained, which represents an 88.4% yield of tri-(beta-ethoxy-ethyl)aluminum. Ultimate analyses shows 56.90% carbon, 11.02% hydrogen, 19.08% oxygen, and 12.96% aluminum, which values check closely with theoretical values. This product ignites spontaneously upon exposure to air and is used successfully to ignite a jet fuel.

The product is further identified by oxidation to the corresponding alcohol by the following procedure. One-half mole of the product is treated with 0.2 mole sodium hydroxide in 100 cc. of ethyl alcohol, and then 60 grams of 30% hydrogen peroxide is added to the mixture at such a rate as to maintain gentle reflux. After the addition is completed, the product is taken up in ether, washed and dried. The oxidation product from the tri-(beta-ethoxy-ethyl)aluminum distills at 135.1° C. in 84% yield, and is identified as glycol monoethyl ether.

EXAMPLE II

The procedure of Example I is repeated, using 11 parts of beryllium hydride in place of the aluminum hydride. 140.6 parts of product are obtained, which represents a 90.8% yield of di-(beta-ethoxy-ethyl)beryllium. Ultimate analyses show 61.24% carbon, 11.69% hydrogen, 20.51% oxygen, and 6.56% beryllium, which values check closely with the theoretical values. The product is successively tested as a jet fuel igniter, and upon oxidation as in Example I gives the identical oxidation product as obtained in that case.

EXAMPLE III

The procedure of Example I is repeated, using 26.3 parts of magnesium hydride in place of the aluminum hydride. 143.1 parts of product are obtained, which represents an 83.9% yield of di-(beta-ethoxy-ethyl)magnesium. Ultimate analyses show 54.58% carbon, 10.43% hydrogen, 17.81% oxygen, and 17.08% magnesium. These values check closely with the theoretical values. This product is found to ignite with a brilliant flame and has good fuel properties. Upon oxidation as in Example I, the identical oxidation product is obtained as in Example I.

EXAMPLE IV

The procedure of Example I is repeated 9 times, using a different monoalkenyl ether as indicated in Table I below, in each case dissolved in 100 parts of hexane and in amount equivalent to that of the vinyl ether used in Example I. In those cases in which the boiling point of the monoalkenyl ether is above 100° C., the unreacted ether is removed by reducing the pressure as much below atmospheric as is necessary to distill off the unreacted ether at temperatures below 100° C. The percentage yields for the metallo-organo product are indicated, as well as the oxidation products by which these compounds are identified, together with the boiling point of the resultant alcohols, and their percentage yields based on the amount of the metallo-organo product used in the oxidation. The metallo-organo products are ignited and in each case show excellent burning properties.

Table I

| Monoalkenyl ether | Metal-organo product | | Oxidation product | | B.P., °C. |
|---|---|---|---|---|---|
| | Identity | Percent yield | Identity | Percent yield | |
| Allyl ethyl ether | $Al(CH_2CH_2CH_2OC_2H_5)_3$ | 86.7 | 3-ethoxy-n-propanol | 89.4 | 160-1. |
| Vinyl-n-butyl ether | $Al(CH_2CH_2OC_4H_9)_3$ | 86.3 | Glycol mono-n-butyl ether | 85.9 | 171-2. |
| Isopropenyl isopropyl ether | $Al(CH_2CHOCHCH_3)_3$ $\;\;\;\;\;\;\;\;\;\;\;\;\;\;\;\;\;\;\;\;\;\;\;\;$ $\;\;\;\;\;\;\;\;\;\;\;\;\;\;\;\;CH_3\;\;CH_3$ | 85.8 | 2-isopropoxy-n-propanol | 87.4 | 141–2 at 736 mm. |
| Vinyl phenyl ether | $Al(CH_2CH_2OC_6H_5)_3$ | 84.9 | Glycol monophenyl ether | 85.6 | 237. |
| Cyclohexenyl ethyl ether | $Al(C_6H_{10}OC_2H_5)_3$ | 83.8 | Ethoxy cyclohexanol | 84.6 | 195. |
| Vinyl benzyl ether | $Al(CH_2CH_2OCH_2C_6H_5)_3$ | 84.7 | Glycol monobenzyl ether | 86.4 | 256. |
| p-Methoxy styrene | $Al(CH_2CH_2C_6H_4OCH_3)_3$ | 86.3 | b-Hydroxyethyl-anisole | 85.4 | 143–6 at 17–19 mm. |
| Vinyl (p-t-butylphenyl) ether | $Al(CH_2CH_2OC_6H_4C_4H_9)_3$ | 87.2 | b-(p-t-Bu-phenoxy) ethanol | 84.9 | 148–53 at 8–11 mm. |
| Allyl phenyl ether | $Al(CH_2CH_2CH_2OC_6H_5)_3$ | 86.4 | 3-phenoxy-n-propanol | 85.6 | 248–50. |

Example V

The procedure of Example IV is repeated, using 11 parts of berillium hydride in place of the aluminum hydride. The results are summarized in Table II below, and the products show excellent burning properties upon ignition in each case.

Table II

| Monoalkenyl ether | Metal-organo product | | Oxidation product | | B.P., °C. |
|---|---|---|---|---|---|
| | Identity | Percent yield | Identity | Percent yield | |
| Ally ethy ether | $Be(CH_2CH_2CH_2OC_2H_5)_2$ | 81.5 | 3-ethoxy-n-propanol | 82.8 | 160–1 |
| Vinyl-n-butyl ether | $Be(CH_2CH_2OC_4H_9)_2$ | 88.7 | Glycol mono-n-butyl ether | 86.4 | 171–2 |
| Isopropenyl isopropyl ether | $Be(CH_2CHOCHCH_3)_2$ $\;\;\;\;\;\;\;\;\;\;\;\;\;\;\;\;\;\;\;\;\;\;\;\;$ $\;\;\;\;\;\;\;\;\;\;\;\;\;\;\;\;CH_3\;\;CH_3$ | 77.9 | 2-isopropoxy-n-propanol | 80.6 | 141–3 at 736–7 mm. |
| Vinyl phenyl ether | $Be(CH_2CH_2OC_6H_5)_2$ | 87.6 | Glycol monophenyl ether | 86.7 | 237. |
| Cyclohexenyl ethyl ether | $Be(C_6H_{10}OC_2H_5)_2$ | 79.6 | Ethoxy cyclohexanol | 77.6 | 195. |
| Vinyl benzyl ether | $Be(CH_2CH_2OCH_2C_6H_5)_2$ | 83.4 | Glycol monobenzyl ether | 80.4 | 256. |
| p-Methoxy styrene | $Be(CH_2CH_2C_6H_4OCH_3)_2$ | 87.3 | b-hydroxyethyl anisole | 86.3 | 143–5 at 17–18 mm. |
| Vinyl(p-t-Bu-phenyl) ether | $Be(CH_2CH_2OC_6H_4C_4H_9)_2$ | 83.7 | b-(p-t-Bu-phenoxy)ethanol | 82.5 | 148–52 at 8–10 mm. |
| Allyl phenyl ether | $Be(CH_2CH_2CH_2OC_6H_5)_2$ | 80.8 | 3-phenoxy-n-propanol | 86.2 | 248–250. |

Example VI

The procedure of Example IV is repeated, using 26.3 parts of magnesium hydride in place of the aluminum hydride. The results are summarized in Table III below, and the metal-organo products in each case show excellent burning properties upon ignition.

Table III

| Monoalkenyl ether | Metal-organo product | | Oxidation product | | B.P., °C. |
|---|---|---|---|---|---|
| | Identity | Percent yield | Identity | Percent yield | |
| Allyl ethyl ether | $Mg(CH_2CH_2CH_2OC_2H_5)_2$ | 80.5 | 3-ethoxy-n-propanol | 81.7 | 160–1. |
| Vinyl-n-butyl ether | $Mg(CH_2CH_2OC_4H_9)_2$ | 87.7 | Glycol mono-n-butyl ether | 85.6 | 171–2. |
| Isopropenyl isopropyl ether | $Mg(CH_2CHOCHCH_3)_2$ $\;\;\;\;\;\;\;\;\;\;\;\;\;\;\;\;\;\;\;\;\;\;\;\;$ $\;\;\;\;\;\;\;\;\;\;\;\;\;\;\;\;CH_3\;\;CH_3$ | 76.9 | 2-Isopropoxy-n-propanol | 79.4 | 141–2 at 736 mm. |
| Vinyl phenyl ether | $Mg(CH_2CH_2OC_6H_5)_2$ | 86.8 | Glycol monophenyl ether | 85.6 | 237. |
| Cyclohexenyl ethyl ether | $Mg(C_6H_{10}OC_2H_5)_2$ | 78.4 | Ethoxy cyclohexanol | 76.9 | 195. |
| Vinyl benzyl ether | $Mg(CH_2CH_2OCH_2C_6H_5)_2$ | 82.5 | Glycol monobenzyl ether | 79.6 | 256. |
| p-Methoxy styrene | $Mg(CH_2CH_2C_6H_4OCH_3)_2$ | 86.4 | b-Hydroxyethyl anisole | 85.3 | 143–5 at 17–18 mm. |
| Vinyl (p-t-Bu-phenyl) ether | $Mg(CH_2CH_2OC_6H_4C_4H_9)_2$ | 82.8 | b-(p-t-Bu-phenyl) ethanol | 81.5 | 148–52 at 8–10 mm. |
| Allyl phenyl ether | $Mg(CH_2CH_2CH_2OC_6H_5)_2$ | 80.2 | 3-phenoxy-b-propanol | 85.2 | 248–250. |

EXAMPLE VII

To a solution of 350 parts of divinyl ether and 300 parts of hexane, maintained at a temperature of −10° C. and under an atmosphere of nitrogen, is added with stirring 86 parts of diethyl aluminum hydride contained in 200 parts of hexane. The temperature is allowed to rise to 10° C. and is maintained there for a period of two hours. Whenever the pressure of the reaction system rises substantially above atmospheric, the byproduct gas is vented off. Then the pressure on the system is gradually reduced so as to evaporate solvent and excess ether, while the temperature is maintained at 10° C. When it appears that the solvent or excess ether is no longer being removed at a reduced pressure of 200 mm., nitrogen is fed into the system until atmospheric pressure is resumed. A yield of 129.8 parts of product is obtained. This represents 83.3% of theoretical yield of diethyl beta-vinyloxy-ethyl aluminum. The ultimate analyses of 61.41% carbon, 10.63% hydrogen, 10.80% oxygen, and 17.16% aluminum check very closely with the theoretical values of 61.55%, 10.8%, 10.35%, and 17.3%, respectively. Oxidation, according to the method of Example I, yields ethanol in a ratio of approximately 2 moles of ethanol per mole of diethyl beta-vinyloxy-ethyl aluminum used. The yield of beta-vinyloxy-ethanol (B.P. 44–45° C. at 10 mm.) from the oxidation is less than the calculated amount since the double bond is apparently attacked to some extent by the excess peroxide. A sample of the reaction product is mixed with a 50—50 mixture of divinyl benzene and ethyl styrene and polymerized for 15 hours at 60° C. with 1% of 1-azo-bis. isobutyronitrile as catalyst to give a product having excellent burning and thrust properties.

Upon repetition of the foregoing procedure, using an equivalent amount of allyl vinyl ether, a mixed product is obtained which has both beta-allyloxy ethyl groups and 3-vinyloxy-n-propyl groups since oxidation yields both beta-allyloxy ethanol and 3-vinyloxy-n-propanol.

EXAMPLE VIII

The procedure of Example VII is repeated, using 39 parts of ethyl beryllium hydride in place of the triethyl aluminum. An 87.7% yield of monoethyl mono-(beta-vinyloxy-ethyl)beryllium is obtained, which gives ultimate analyses checking closely with the theoretical values. Oxidation, according to the method of Example I, yields ethanol in a ratio of approximately one mole of ethanol per mole of methyl beta-vinyloxy-ethyl beryllium used. A yield of beta-vinyloxy-ethanol corresponding to (approximately twice) that obtained in Example VII is obtained and a sample of the reaction product copolymerized as in Example VII gives a product having excellent burning and thrust properties.

Upon repetition of the foregoing procedure, using an equivalent amount of allyl-vinyl ether, a mixed product is obtained which has both beta-allyloxy ethyl groups and 2-vinyloxy-n-propyl groups, since oxidation yields both beta-allyloxy ethanol, and 3-vinyloxy-n-propanol.

EXAMPLE IX

The procedure of Example VII is repeated using 54.3 parts of ethyl magnesium hydride in place of the triethyl aluminum. An 85.3% yield of monoethyl mono-(beta-vinyloxy-ethyl) magnesium is obtained, which gives ultimate analyses checking closely with the theoretical values. Oxidation, according to the method of Example I, yields ethanol in a ratio of approximately one mole of ethanol per mole of methyl beta-vinyloxy-ethyl magnesium used. A yield of beta-vinyloxy-ethanol corresponding to that obtained in Example VIII is obtained and a sample of the reaction product copolymerized as in Example VII gives a product having excellent burning and thrust properties.

Upon repetition of the foregoing procedure using an equivalent amount of allyl-vinyl ether, a mixed product is obtained which has both beta-allyloxy ethyl groups and 3-vinyloxy-n-propyl groups, since oxidation yields both beta-allyloxy ethanol, and 3-vinyloxy-n-propanol.

EXAMPLE X

The procedure of Example VII is repeated, using 58 parts of ethyl aluminum dihydride in place of the diethyl aluminum hydride, and 420 parts of divinyl ether in place of the 350 parts used in Example VII. A yield of 180.4 parts of product is obtained, which represents a 91.2% theoretical yield of ethyl di-(beta-vinyloxy-ethyl)aluminum. Ultimate analyses show 60.22% carbon, 9.58% hydrogen, 16.23% oxygen, and 13.97% aluminum, which values check closely with theoretical values for the above compounds. Upon oxidation, according to the procedure of Example I, the product yields approximately one mole of ethanol per mole of product oxidized. The yield of beta-vinyloxy-ethanol from this oxidation is less than the theoretical, apparently because the excess peroxide also attacks to some extent the double bond of the product. A sample of the product is mixed with 25% styrene and polymerized at 60° C. for 15 hours with 1% of 1-azo-bis-cyclohexencarbonitrile to give a product that has excellent burning and thrust properties.

EXAMPLE XI

The procedure of Example VII is repeated, except that 700 parts of divinyl ether and 1000 parts of hexane are used, and in place of the diethyl aluminum hydride, a solution of 30 parts of aluminum hydride contained in 200 parts of diethyl ether is fed into the reaction mixture. A yield of 198 parts of product is obtained, which represents an 82.7% theoretical yield of tri-(beta-vinyloxy-ethyl) aluminum. Ultimate analyses give 59.24% carbon, 8.54% hydrogen, 20.06% oxygen, and 12.16% aluminum, all of which values check closely with the theoretical values for the above compound. A sample of the product is polymerized at 60° C. for 15 hours with 1% of 2-azo-bis-2-methyl-heptonitrile as catalyst to give a solid product having excellent burning and thrust properties.

The foregoing procedure is repeated using an equivalent amount of para-vinyloxy styrene in place of the divinyl ether to give the corresponding tri-substituted aluminum compound which is successfully polymerized as in the preceding example.

EXAMPLE XII

The procedure of Example XI is repeated, using an equivalent amount of diallyl ether in place of the divinyl ether, and using 11 parts of beryllium hydride in place of the 30 parts of aluminum hydride. The di-(3-allyloxy-n-propyl)beryllium product is polymerized as in Example XI to give a product having excellent burning and thrust properties.

The foregoing procedure is repeated with similar results using divinyl ether of ethylene glycol.

EXAMPLE XIII

The procedure of Example XI is repeated, using an equivalent amount of diisopropenyl ether in place of the divinyl ether and using 26.3 parts of magnesium hydride in place of the aluminum hydride. The di-(2-isopropenyloxy-n-propyl) magnesium product is polymerized as in Example XI to give a product having excellent burning and thrust properties.

The foregoing procedure is repeated using diallyl ether in place of the diisopropenyl ether to give a monomeric product, which upon polymerization as in Example XI gives a product having excellent burning and thrust properties.

EXAMPLE XIV

Tripropyl aluminum (156 parts), protected by a blanket of nitrogen, is added slowly to 1000 parts of diallyl ether maintained at a temperature of 25°–30° C. under a blanket of nitrogen. This temperature is maintained for a period of one hour after the tripropyl aluminum has been added and byproduct gas is allowed to escape. The temperature is then reduced to 0° C. and the pressure reduced gradually to remove unreacted diallyl ether. When the ether is no longer given off, the reaction system is allowed to resume atmospheric pressure under an atmosphere of nitrogen. The product represents an 85.4% yield of theoretical for tri-(3-allyloxy-n-propyl)-aluminum. Ultimate analyses give 66.42% carbon, 10.01% hydrogen, 14.59% oxygen, and 8.97% aluminum, all of which values check closely with the theoretical values for the above compound. This product is polymerized for 15 hours at 60° C. using 1% of 2,2′-azo-bis-2-ethyl butyronitrile as catalyst to give a solid resin having excellent burning and thrust properties. Oxidation of the monomer as in Example I gives 3-allyloxy-n-propanol.

The foregoing procedure when repeated, using an equivalent amount of vinyloxy styrene in place of the diallyl ether, gives a monomeric product which upon polymerization as in Example XIV, gives a solid resin having excellent burning and thrust properties.

EXAMPLE XV

The procedure of Example XIV is repeated, using an equivalent amount of divinyl cyclohexane in place of the diallyl ether, and 123 parts of dibutyl berryllium in place of the tripropyl aluminum. The di-(vinyloxy-(cyclohexyl)-ethyl) berylium is polymerized as in Example XIV to give a solid resin having excellent burning properties.

The foregoing procedure is repeated with divinyl ether to give the corresponding di-(vinyloxy-(cyclohexyl)-ethyl) magnesium monomer.

EXAMPLE XVI

The procedure of Example XIV is repeated, using 82 parts of diethyl magnesium in place of the tripropyl aluminum and an equivalent amount of 2-methoxy-butadiene-1,3 in place of the diallyl ether. The corresponding di-(methoxy-butenyl) magnesium product is polymerized as in Example XIV to give a product which has excellent burning and thrust properties.

The foregoing procedure is repeated with divinyl ether to give the corresponding di-(vinyloxy-ethyl) magnesium monomer.

EXAMPLE XVII

The procedure of Example XIV is repeated, using 198 parts of triisobutyl aluminum and 1700 parts of the divinyl ether of resorcinol. The yield of tri-(vinyloxy-phenoxy-ethyl)-aluminum represents 84.2% of theoretical.

EXAMPLE XVIII

The procedure of Example XIV is repeated, using the various hydrocarbon-substituted metal compounds and dialkenyl ethers indicated in Table IV below, each in an amount equivalent to the amount of metal compound and ether, respectively, used in Example XIV. The table indicates the percentage yield for the triply-unsaturated product in each case for the aluminum derivatives, and the doubly-unsaturated product in each case for the beryllium and magnesium derivatives.

*Table IV*

| Hydrocarbon-substituted metal compound | Dialkenyl compound | Percent of theoretical yield |
|---|---|---|
| Tri-pentyl aluminum | Vinyloxy styrene | 86.4 |
| Tri-phenyl aluminum | Ethylene glycol diallyl ether | 87.3 |
| Tri-cyclohexyl aluminum | Ethoxy-divinyl benzene | 82.6 |
| Tri-benzyl aluminum | Allyloxy-cyclohexene | 81.4 |
| Di-pentyl magnesium | Vinyloxy styrene | 83.7 |
| Di-phenyl magnesium | Ethylene glycol diallyl ether | 86.2 |
| Di-cyclohexyl magnesium | Ethoxy-divinyl benzene | 81.3 |
| Di-benzyl magnesium | Allyloxy-cyclohexene | 79.8 |
| Di-pentyl beryllium | Vinyloxy styrene | 84.6 |
| Di-phenyl beryllium | Ethylene glycol diallyl ether | 85.8 |
| Di-cyclohexyl beryllium | Ethoxy-divinyl benzene | 81.9 |
| Di-benzyl beryllium | Allyloxy-cyclohexene | 78.6 |

EXAMPLE XIX

The procedure of Example XIV is repeated, using an equivalent amount of para-vinyloxy styrene in place of the diallyl ether. However, the pressure is not reduced to remove unreacted ether, and instead the catalyst is added directly to the reaction mass and polymerization effected to give an infusible mass containing aluminum.

EXAMPLE XX

The procedure of Example XIV is repeated, using 500 parts instead of the 1000 parts of diallyl ether, and maintaining the temperature at about 40° C. for three hours. Then the reaction is completed as in Example XIV. The analyses indicate a considerable proportion of byproduct polymer and derivative probably formed from the addition of two atoms of aluminum to the diallyl ether, whereas the ultimate analyses of Example XIV indicate that if any impurities are present in that product they are probably small amounts of the compound resulting from incomplete replacement of the ethyl groups. The presence of these byproducts is confirmed by oxidizing as in Example I, following which distillation of the product gives 3,3'-dihydroxy-di-n-propyl ether (B.P. 155°–160° C. at 15 mm.) as well as the expected 3-allyloxy-n-propanol.

EXAMPLE XXI

Samples of the monomers obtained in Examples VII through XX, respectively, are individually treated with irradiation dosages of 50 megareps derived from an irradiation source equivalent to 100,000 electron volts, in each case separate samples being exposed to irradiation from an electron accelerator of the Arco type, a Van de Graaff generator, cobalt 60, X-rays, and bombarded beryllium. In each case a solid polymer product is obtained, which exhibits excellent burning and thrust properties.

EXAMPLE XXII

The monomers of Examples VII through XX are polymerized individually, using 0.5% iodine as catalyst. A solid polymeric product is obtained in each case, which upon testing shows excellent combustion and thrust properties.

EXAMPLE XXIII

Samples of each of the polymer products obtained in Examples VII through XX, respectively, are individually ground under an atmosphere of nitrogen, with 50% potassium perchlorate, 60% ammonium nitrate, and 70% ammonium perchlorate, respectively, to give mixtures which give excellent results when tested for combustion and thrust properties.

Compounds prepared by the practice of this invention include, but are not restricted to, the following, in some of which compounds "b" is used to indicate "beta" substitution:

Tri-(b-ethoxy-ethyl)-aluminum,
Methyl-di-(b-ethoxy-ethyl)-aluminum,
Ethyl-di-(b-ethoxy-ethyl)-aluminum,
Butyl-di-(b-ethoxy-ethyl)-aluminum,
Dimethyl-(b-ethoxy-ethyl)-aluminum,
Diethyl-(b-ethoxy-ethyl)-aluminum,
Dipropyl-(b-ethoxy-ethyl)-aluminum,
Tri-(b-isopropoxy-ethyl)-aluminum,
Methyl-di-(b-isopropoxy-ethyl)-aluminum,
Diethyl-(b-isopropoxy-ethyl)-aluminum,
Tri-(n-butoxy-ethyl)-aluminum,
Ethyl-di-(b-butoxy-ethyl)-aluminum,
Diethyl-(b-butoxy-ethyl)-aluminum,
Tri-(b-amyloxy-ethyl)-aluminum,
Propyl-di-(b-amyloxy-ethyl)-aluminum,
Dipropyl-(b-amyloxy-ethyl)-aluminum,
Tri-(b-phenethyloxy-ethyl)-aluminum,
Propyl-di-(b-phenethyloxy-ethyl)-aluminum,
Dipropyl-(phenethyloxy-ethyl)-aluminum,
Tri-(b-phenoxy-ethyl)-aluminum,
Ethyl-di-(b-phenoxy-ethyl)-aluminum,
Diethyl-(b-phenoxy-ethyl)-aluminum,
Tri-(b-cyclohexyloxy-ethyl)-aluminum,
Propyl-di-(b-cyclohexyloxy-ethyl)-aluminum,
Diethyl-(b-cyclohexyloxy-ethyl)-aluminum,
Dibutyl-(b-benzyloxy-ethyl)-aluminum,
Tri-(b-benzyloxy-ethyl)-aluminum,
Butyl-di-(b-benzyloxy-ethyl)-aluminum,
Tri-(b-cyclopentyloxy-ethyl)-aluminum,
Tri-(b-naphthyloxy-ethyl)-aluminum,
Amyl-di-(b-naphthyloxy-ethyl)-aluminum,
Tri-(3-ethoxy-n-propyl)-aluminum,
Methyl-di-(3-ethoxy-n-propyl)-aluminum,
Dimethyl-(3-ethoxy-n-propyl)-aluminum,
Tri-(3-butoxy-n-propyl)-aluminum,
Butyl-di-(3-amyloxy-n-propyl)-aluminum,
Dipropyl-(3-amyloxy-n-propyl)-aluminum,
Tri-(3-phenethyloxy-n-propyl)-aluminum,
Ethyl-di-(3-phenethyloxy-n-propyl)-aluminum,
Diamyl-(3-phenethyloxy-n-propyl)-aluminum,
Tri-(2-phenoxy-n-propyl)-aluminum,
Propyl-di-(2-phenoxy-n-propyl)-aluminum,
Dibutyl-(2-phenoxy-n-propyl)-aluminum,
Tri-[beta-(phenoxyphenyl)-ethyl]-aluminum,
Diethyl-[beta-(phenoxyphenyl)-ethyl]-aluminum, Phenyl-di-[3-(ethoxyphenyl)-n-propyl]-aluminum,
Distyryl-[b-(ethoxynaphthyl)-ethyl]-aluminum,
Dicyclohexyl-[beta-(4'-ethoxy-diphenyl)-ethyl]-aluminum,
Tri-(p-ethoxy-phenethyl)-aluminum,
Tri-(4-butoxy-cyclohexyl-ethyl)-aluminum,
Tri-(1-methyl-3-ethoxy-n-propyl)-aluminum,
Tri-[beta-(beta-ethoxy-ethoxy)-ethyl]-aluminum,
Tri-[beta-(beta-ethoxy-phenoxy)-ethyl]-aluminum,
Tri-(1-ethoxy-methyl-3-methoxy-n-propyl)-aluminum,
Tri-(b-vinyloxy-ethyl)-aluminum,
Methyl-di-(b-vinyloxy-ethyl)-aluminum,
Dimethyl-(b-vinyloxy-ethyl)-aluminum,
Ethyl-di-(b-vinyloxy-ethyl)-aluminum,
Dipropyl-(b-vinyloxy-ethyl)-aluminum,
Butyl-(b-vinyloxy-ethyl)-aluminum,
Diamyl-(b-vinyloxy-ethyl)-aluminum,
Phenethyl-di-(b-vinyloxy-ethyl)-aluminum,
Diphenyl-(b-vinyloxy-ethyl)-aluminum,
Cyclohexyl-di-(b-vinyloxy-ethyl)-aluminum,
Dibenzyl-(b-vinyloxy-ethyl)-aluminum,
Tri-(3-allyloxy-n-propyl)-aluminum,
Methyl-di-(3-allyloxy-n-propyl)-aluminum,
Dimethyl-(3-allyloxy-n-propyl)-aluminum,
Ethyl-di-(3-allyloxy-n-propyl)-aluminum,
Dibutyl-(3-allyloxy-n-propyl)-aluminum,
Phenethyl-(3-allyloxy-n-propyl)-aluminum,
Diphenyl-(3-allyloxy-n-propyl)-aluminum,
Dicyclohexyl-(3-allyloxy-n-propyl)-aluminum,
Benzyl-di-(3-allyloxy-n-propyl)-aluminum,
Tri-(2-isopropenyloxy-n-propyl)-aluminum,
Methyl-di-(2-isopropenyloxy-n-propyl)-aluminum,
Dimethyl-(2-isopropenyloxy-n-propyl)-aluminum,
Diethyl-(2-isopropenyloxy-n-propyl)-aluminum,
Propyl-di-(2-isopropenyloxy-n-propyl)-aluminum,
Dibutyl-(2-isopropenyloxy-n-propyl)-aluminum,
Amyl-di-(1-isopropenyloxy-n-propyl)-aluminum,
Diphenethyl-(2-isopropenyloxy-n-propyl)-aluminum,
Ethoxyphenyl-di-(2-isopropenyloxy-n-propyl)-aluminum,
Dibenzyl-(2-isopropenyloxy-n-propyl)-aluminum,
Tri-[beta-(p-vinyloxy-phenoxy)-ethyl]-aluminum,
Methyl-di-[beta-(p-vinyloxy-phenoxy)-ethyl]-aluminum,
Dipropyl-[beta-(p-vinyloxy-phenoxy)-ethyl]-aluminum,
Butyl-di-[beta-(p-vinyloxy-phenoxy)-ethyl]-aluminum,
Diamyl-[beta-(p-vinyloxy-phenoxy)-ethyl]-aluminum,
Diphenethyl-[beta-(p-vinyloxy-phenoxy)-ethyl]-aluminum,
Phenyl-di-[beta-(p-vinyloxy-phenoxy)-ethyl]-aluminum,
Cyclohexyl-di-[beta-(p-vinyloxy-phenoxy)-ethyl]-aluminum,
Benzyl-di-[beta-(p-vinyloxy-phenoxy)-ethyl]-aluminum,
Tri-[3-(allyloxy-phenoxy)n-propyl]-aluminum,
Methyl-di-[3-(allyloxy-phenoxy)-n-propyl]-aluminum,
Diethyl-[3-(allyloxy-phenoxy)-n-propyl]-aluminum,
Dipropyl-[3-(allyloxy-phenoxy)-n-propyl]-aluminum,
Butyl-di-[3-(allyloxy-phenoxy)-n-propyl]-aluminum,
Diamyl-[3-(allyloxy-phenoxy)-n-propyl]-aluminum,
Phenethyl-[3-(allyloxy-phenoxy)-n-propyl]-aluminum,
Diphenyl-[3-(allyloxy-phenoxy)-n-propyl]-aluminum,
Cyclohexyl-di-[3-(allyloxy-phenoxy)-n-propyl]-aluminum,
Dibenzyl-[4-(allyloxy-phenoxy)-n-propyl]-aluminum,
Tri-[beta-(vinyloxy-phenethyl)-ethyl]-aluminum,
Methyl-di-[beta-(vinyloxy-phenyl)-ethyl]-aluminum,
Diethyl-[beta-(vinyloxy-phenyl)-ethyl]-aluminum,
Tri-[beta-(vinyl-phenoxy)-ethyl]-aluminum,
Tri-[b-(p-vinyl-m-ethoxy-phenyl)-ethyl]-aluminum,
Dimethyl-[b-(p-vinyl-m-ethoxy-phenyl)-ethyl]-aluminum,
Propyl-di-[b-(p-vinyl-m-ethoxy-phenyl)-ethyl]-aluminum,
Tri-(b-allyloxy-ethyl)-aluminum,
Tri-(3-vinyloxy-n-propyl)-aluminum,
Di-(3-vinyloxy-n-propyl)-(allyloxy-ethyl)-aluminum,
Tri-(b-crotyloxy-ethyl)-aluminum,
Tri-(b-isopropenyloxy-ethyl)-aluminum,
Tri-b-[b-(b-vinyloxy-ethoxy)-ethoxy]-ethyl-aluminum,
Tri-b-(divinyl-phenyl)-ethyl-aluminum,
Bis-(b-dimethyl-aluminum-ethyl)-styrene,
Tri-(b-cyclohexenyloxy-ethyl)-aluminum,
Tri-b-(ethoxy-cyclohexyl)-ethyl-aluminum,
Tri-[b-(2-ethoxy-4-vinyl-cyclohexyl)-ethyl]-aluminum,
Tri-(cyclohexenyloxy-cyclohexyl)-aluminum,
Tri-(dihydrofuryl)-aluminum, etc.;
Di-(b-ethoxy-ethyl)-beryllium,
Methyl-(b-ethoxy-ethyl)-beryllium,
Ethyl-(b-ethoxy-ethyl)-beryllium,
Butyl-(b-ethoxy-ethyl)-beryllium,
Propyl-(b-ethoxy-ethyl)-beryllium,
Di-(b-isopropoxy-ethyl)-beryllium,
Methyl-(b-isopropoxy-ethyl)-beryllium,
Ethyl-(b-isopropoxy-ethyl)-beryllium,
Di-(n-butoxy-ethyl)-beryllium,
Ethyl-(b-butoxy-ethyl)-beryllium,
Di-(b-amyloxy-ethyl)-beryllium,
Propyl-(b-amyloxy-ethyl)-beryllium,
Di-(b-phenethyloxy-ethyl)-beryllium,
Propyl-(b-phenethyloxy-ethyl)-beryllium,
Di-(b-phenoxy-ethyl)-beryllium,
Ethyl-(b-phenoxy-ethyl)-beryllium,
Di-(b-cyclohexyloxy-ethyl)-beryllium,
Propyl-(b-cyclohexyloxy-ethyl)-beryllium,
Ethyl-(b-cyclohexyloxy-ethyl)-beryllium,
Di-(b-benzyloxy-ethyl)-beryllium,
Butyl-(b-benzyloxy-ethyl)-beryllium,
Di-(b-naphthyloxy-ethyl)-beryllium,
Amyl-(b-naphthyloxy-ethyl)-beryllium,
Di-(b-cyclopentyloxy-ethyl)-beryllium,
Di-(3-ethoxy-n-propyl)-beryllium,
Methyl-(3-ethoxy-n-propyl)-beryllium,
Di-(3-butoxy-n-propyl)-beryllium,
Butyl-(3-amyloxy-n-propyl)-beryllium,
Propyl-(3-amyloxy-n-propyl)-beryllium,
Di-(3-phenethyloxy-n-propyl)-beryllium,
Ethyl-(3-phenethyloxy-n-propyl)-beryllium,
Amyl-(3-phenethyloxy-n-propyl)-beryllium,
Di-(2-phenoxy-n-propyl)-beryllium,
Propyl-(2-phenoxy-n-propyl)-beryllium,
Butyl-(2-phenoxy-n-propyl)-beryllium,
Di-(2-cyclohexyloxy-ethyl)-beryllium,
Di-(3-benzyloxy-n-propyl)-beryllium,
Di-[beta-(phenoxyphenyl)-ethyl]-beryllium,
Ethyl-[beta-(phenoxyphenyl)-ethyl]-beryllium,
Phenyl-[(3-ethoxyphenyl)-n-propyl]-beryllium,
Styryl-[b-(ethoxynaphthyl)-ethyl]-beryllium,
Cyclohexyl-[beta-(4-ethoxy-diphenyl)-ethyl]-beryllium,
Di-(p-ethoxy-phenethyl)-beryllium,
Di-(4-butoxy cyclohexyl-ethyl)-beryllium,
Di-(1-methyl-3-ethoxy-n-propyl)-beryllium,
Di-[beta-(beta-ethoxy-ethoxy)-ethyl]-beryllium,
Di-[beta-(beta-ethoxy-phenoxy)-ethyl]-beryllium,
Di-(1-ethoxy-methyl-3-methoxy-n-propyl)-beryllium,
Di-(b-vinyloxy-ethyl)-beryllium,
Methyl-(b-vinyloxy-ethyl)-beryllium,
Ethyl-(b-vinyloxy-ethyl)-beryllium,
Propyl-(b-vinyloxy-ethyl)-beryllium,
Amyl-(b-vinyloxy-ethyl)-beryllium,
Phenethyl-(b-vinyloxy-ethyl)-beryllium,
Phenyl-(b-vinyloxy-ethyl)-beryllium,
Cyclohexyl-(b-vinyloxy-ethyl)-beryllium,
Benzyl-(b-vinyloxy-ethyl)-beryllium,
Di-(3-allyloxy-n-propyl)-beryllium,
Methyl-(3-allyloxy-n-propyl)-beryllium,
Ethyl-(3-allyloxy-n-propyl)-beryllium,
Butyl-(3-allyloxy-n-propyl)-beryllium,
Phenethyl-(3-allyloxy-n-propyl)-beryllium,
Phenyl-(3-allyloxy-n-propyl)-beryllium,
Cyclohexyl-(3-allyloxy-n-propyl)-beryllium,
Benzyl-(3-allyloxy-n-propyl)-beryllium,
Di-(2-isopropenyloxy-n-propyl)-beryllium,
Methyl-(2-isopropenyloxy-n-propyl)-beryllium, Ethyl-(2-isopropenyloxy-n-propyl)-beryllium,
Propyl-(2-isopropenyloxy-n-propyl)-beryllium,
Amyl-(2-isopropenyloxy-n-propyl)-beryllium,
Phenethyl-(1-isopropenyloxy-n-propyl)-beryllium,
Ethoxyphenyl-(2-isopropenyloxy-n-propyl)-beryllium,
Benzyl-(2-isopropenyloxy-n-propyl)-beryllium,
Di-[beta-(p-vinyloxy-phenoxy)-ethyl]-beryllium,
Methyl-[beta-(p-vinyloxy-phenoxy)-ethyl]-beryllium,
Propyl-[beta-(p-vinyloxy-phenoxy)-ethyl]-beryllium,
Butyl-[beta-(p-vinyloxy-phenoxy)-ethyl]-beryllium,
Amyl-[beta-(p-vinyloxy-phenoxy)-ethyl]-beryllium,
Phenethyl-[beta-(p-vinyloxy-phenoxy)ethyl]-beryllium,
Phenyl-[beta-(p-vinyloxy-phenoxy)-ethyl]-beryllium,
Cyclohexyl-[beta-(p-vinyloxy-phenoxy)-ethyl]-beryllium,
Benzyl-[beta-(p-vinyloxy-phenoxy)-ethyl]-beryllium,
Di-[3-(allyloxy-phenoxy)-n-propyl]-beryllium,
Methyl-[3-(allyloxy-phenoxy)-n-propyl]-beryllium,
Ethyl-[3-(allyloxy-phenoxy)-n-propyl]-beryllium,
Propyl-[3-(allyloxy-phenoxy)-n-propyl]-beryllium,
Butyl-[3-(allyloxy-phenoxy)-n-propyl]-beryllium,
Amyl-[3-(allyloxy-phenoxy)-n-propyl]-beryllium,
Phenethyl-[3-(allyloxy-phenoxy)-n-propyl]-beryllium,
Phenyl-[3-(allyloxy-phenoxy)-n-propyl]-beryllium,
Cyclohexyl-[3-(allyloxy-phenoxy)-n-propyl]-beryllium,
Benzyl-[3-(allyloxy-phenoxy)-n-propyl]-beryllium,
Di-[beta-(vinyloxy-phenyl)-ethyl]-beryllium,
Methyl-[beta-(vinyloxy-phenyl)-ethyl]-beryllium,
Ethyl-[beta-(vinyloxy-phenyl)-ethyl]-beryllium,
Di-[beta-(vinyl-phenoxy)-ethyl]-beryllium,
Di-[b-(p-vinyl-m-ethoxy-phenyl)-ethyl]-beryllium,
Methyl-[b-(p-vinyl-m-ethoxy-phenyl)-ethyl]-beryllium,
Propyl-[b-(p-vinyl-m-ethoxy-phenyl)-ethyl]-beryllium,
Di-(b-allyloxy-ethyl)-beryllium,
Di-(3-vinyloxy-n-propyl)-beryllium,
(3-vinyloxy-n-propyl)-(allyloxy-ethyl)-beryllium,
Di-(b-crotyloxy-ethyl)-beryllium,
Di-(b-isopropenyloxy-ethyl)-beryllium,
Di-b-[b-(b-vinyloxy-ethoxy)-ethoxy]-ethyl-beryllium,
Di-b-(divinyl-phenyl)-ethyl-beryllium,
Bis-(b-methyl-beryllium-ethyl)-styrene,
Di-(b-cyclohexenyloxy)-ethyl-beryllium,
Di-b-(ethoxy-cyclohexenyl)-ethyl-beryllium,
Di-[b-(2-ethoxy-4-vinyl-cyclohexyl)-ethyl]-beryllium,
Di-(cyclohexenyloxy-cyclohexyl)-beryllium,
Di-(dihydrofuryl)-beryllium, etc.;
Di-(b-ethoxy-ethyl)-magnesium,
Methyl-(b-ethoxyethyl)-magnesium,
Ethyl-(b-ethoxy-ethyl)-magnesium,
Butyl-(b-ethoxy-ethyl)-magnesium,
Propyl-(b-ethoxy-ethyl)-magnesium,
Di-(b-isopropoxy-ethyl)-magnesium,
Methyl-(b-isopropoxy-ethyl)-magnesium,
Ethyl-(b-isopropoxy-ethyl)-magnesium,
Di-(n-butoxy-ethyl)-magnesium,
Ethyl-(b-butoxy-ethyl)-magnesium,
Di-(b-amyloxy-ethyl)-magnesium,
Propyl-(b-amyloxy-ethyl)-magnesium,
Di-(b-phenethyloxy-ethyl)-magnesium,
Propyl-(b-phenethyloxy-ethyl)-magnesium,
Di-(b-phenoxy-ethyl)-magnesium,
Ethyl-(b-phenoxy-ethyl)-magnesium,
Di-(b-cyclohexyloxy-ethyl)-magnesium,
Propyl-(b-cyclohexyloxy-ethyl)-magnesium,
Ethyl-(b-cyclohexyloxy-ethyl)-magnesium,
Di-(b-benzyloxy-ethyl)-magnesium,
Butyl-(b-benzyloxy-ethyl)-magnesium,
Di-(b-naphthyloxy-ethyl)-magnesium,
Amyl-(b-naphthyloxy-ethyl)-magnesium,
Di-(b-cyclopentyloxy-ethyl)-magnesium,
Di-(3-ethoxy-n-propyl)-magnesium,
Methyl-(3-ethoxy-n-propyl)-magnesium,
Di-(3-butoxy-n-propyl)-magnesium,
Butyl-(3-amyloxy-n-propyl)-magnesium,
Propyl-(3-amyloxy-n-propyl)-magnesium,
Di-(3-phenethyloxy-n-propyl)-magensium,
Ethyl-(3-phenethyloxy-n-propyl)-magnesium,
Amyl-(3-phenethyloxy-n-propyl)-magnesium,
Di-(2-phenoxy-n-propyl)-magnesium,
Propyl-(2-phenoxy-n-propyl)-magnesium,
Butyl-(2-phenoxy-n-propyl)-magnesium,
Di-(2-cyclohexyloxy-ethyl)-magnesium,
Di-(3-benzyloxy-n-propyl)-magnesium,
Di-[beta-(phenoxyphenyl)-ethyl]-magnesium,
Ethyl-[beta-(phenoxyphenyl)-ethyl]-magnesium,
Phenyl-[3-(ethoxyphenyl)-n-propyl]-magnesium,
Styryl-[b-(ethoxynaphthyl)-ethyl]-magnesium,
Cyclohexyl-[beta-(4'-ethoxy-diphenyl)-ethyl]-magnesium,
Di-(p-ethoxy-phenethyl)-magnesium
Di-(4-butoxy-cyclohexyl-ethyl)-magnesium,
Di-(1-methyl-3-ethoxy-n-propyl)-magnesium,
Di-[beta-(beta-ethoxy-ethoxy)-ethyl]-magnesium,
Di-[beta-(beta-ethoxy-phenoxy)-ethyl]-magnesium,
Di-(1-ethoxy-methyl-3-methoxy-n-propyl)-magnesium,
Di-(b-vinyloxy-ethyl)-magnesium,
Methyl-(b-vinyloxy-ethyl)-magnesium,
Ethyl-(b-vinyloxy-ethyl)-magnesium,
Propyl-(b-vinyloxy-ethyl)-magnesium,
Butyl-(b-vinyloxy-ethyl)-magnesium,
Amyl-(b-vinyloxy-ethyl)-magnesium,
Phenethyl-(b-vinyloxy-ethyl)-magnesium,
Phenyl-(b-vinyloxy-ethyl)-magnesium,
Cyclohexyl-(b-vinyloxy-ethyl)-magnesium,
Benzyl-(b-vinyloxy-ethyl)-magnesium,
Di-(3-allyloxy-n-propyl)-magnesium,
Methyl-(3-allyloxy-n-propyl)-magnesium,
Ethyl-(3-allyloxy-n-propyl)-magnesium,
Butyl-(3-allyloxy-n-propyl)-magnesium,
Phenethyl-(3-allyloxy-n-propyl)-magnesium,
Phenyl-(3-allyloxy-n-propyl)-magnesium,
Cyclohexyl-(3-allyloxy-n-propyl)-magnesium,
Benzyl-(3-allyloxy-n-propyl)-magnesium,
Di-(2-isopropenyloxy-n-propyl)-magnesium,
Methyl-(2-isopropenyloxy-n-propyl)-magnesium,
Ethyl-(2-isopropenyloxy-n-propyl)-magnesium,
Propyl-(2-isopropenyloxy-n-propyl)-magnesium,
Amyl-(2-isopropenyloxy-n-propyl)-magnesium,
Phenethyl-(2-isopropenyloxy-n-propyl)-magnesium,
Ethoxyphenyl-(2-isopropenyloxy-n-propyl)-magnesium,
Benzyl-(2-isopropenyloxy-n-propyl)-magnesium,
Di-[beta-(p-vinyloxy-phenoxy)-ethyl]-magnesium,
Methyl-[beta-(p-vinyloxy-phenoxy)-ethyl]-magnesium,
Propyl-[beta-(p-vinyloxy-phenoxy)-ethyl]-magnesium,
Butyl-[beta-(p-vinyloxy-phenoxy)-ethyl]-magnesium,
Amyl-[beta-(p-vinyloxy-phenoxy)-ethyl]-magnesium,
Phenethyl-[beta-(p-vinyloxy-phenoxy)-ethyl]-magnesium,
Phenyl-[beta-(p-vinyloxy-phenoxy)-ethyl]-magnesium,
Cyclohexyl-[beta-(p-vinyloxy-phenoxy)-ethyl]-magnesium,
Benzyl-[beta-(p-vinyloxy-phenoxy)-ethyl]-magnesium,
Di-[3-(allyloxy-phenoxy)-n-propyl]-magnesium,
Methyl-[3-(allyloxy-phenoxy)-n-propyl]-magnesium,
Ethyl-[3-(allyloxy-phenoxy)-n-propyl]-magnesium,
Propyl-[3-(allyloxy-phenoxy)-n-propyl]-magnesium,
Butyl-[3-(allyloxy-phenoxy)-n-propyl]-magnesium,
Amyl-[3-(allyloxy-phenoxy)-n-propyl]-magnesium,
Phenethyl-[3-(allyloxy-phenoxy)-n-propyl]-magnesium,
Phenyl-[3-(allyloxy-phenoxy)-n-propyl]-magnesium,
Cyclohexyl-[3-(allyloxy-phenoxy)-n-propyl]-magnesium,
Benzyl-[3-(allyloxy-phenoxy)-n-propyl]-magnesium,
Di-[beta-(vinyloxy-phenyl)-ethyl]-magnesium,
Methyl-[beta-(vinyloxy-phenyl)-ethyl]-magnesium,
Ethyl-[beta-(vinyloxy-phenyl)-ethyl]-magnesium,
Di-[beta-(vinyl-phenoxy)-ethyl]-magnesium,
Di-[b-(p-vinyl-m-ethoxy-phenyl)-ethyl]-magnesium,
Methyl-[b-(p-vinyl-m-ethoxy-phenyl)-ethyl]-magnesium,
Propyl-[b-(p-vinyl-m-ethoxy-phenyl)-ethyl]-magnesium,
Di-(b-allyloxy-ethyl)-magnesium,
Di-(3-vinyloxy-n-propyl)-magnesium, Di-(b-crotyloxy-ethyl)-magnesium,
Di-(b-isopropenyloxy-ethyl)-magnesium,
Di-b-[b-(vinyloxy-ethoxy)-ethoxy]-ethyl-magnesium,
Di-b-[b-(b-vinyloxy-ethoxy)-ethoxy]-ethyl-magnesium,
Di-b-(divinyl-phenyl)-ethyl-magnesium,
Bis-(b-methyl-magnesium-ethyl)-styrene,
Di-(b-cyclohexenyloxy-ethyl)-magnesium,
Di-b-(ethoxy-cyclohexenyl)-ethyl-magnesium,
Di-[b-(2-ethoxy-4-vinyl-cyclohexyl)-ethyl]-magnesium,
Di-(cyclohexenyloxy-cyclohexyl)-magnesium,
Di-(dihydrofuryl)-magnesium, etc.

In polymerizing the polymerizable monomers of this invention, various other polymerizable ethylenic compounds can be used to modify the properties of the resultant polymers. For example, as comonomers there can be used: styrene, divinyl benzene, vinyl toluene, divinyl naphthalene, divinyl ether, vinyl ethyl ether, isobutylene, butadiene, vinyl cyclohexene, divinyl cyclohexene, diallyl ether, isopropenyl benzene, allyl benzene, etc. Furthermore the properties of the polymers can also be modified by the addition of other polymeric materials, such as, for example, polystyrene, polyisobutylene, synthetic and natural rubber, and other polymers and copolymers of polymerizable ethylenic compounds, such as those listed above as suitable as comonomers. These can be added in various proportions, depending on the particular type of properties desired in the resultant mixtures. Furthermore, various other materials can be added to modify the properties of the monomers and polymers of this invention, for example, oxidizing agents as illustrated above, inhibitors, auxiliary fuel materials, etc. When heterogeneous surface active catalysts, such as the Ziegler catalyst system, are used to catalyze the polymerization of the monomers of this invention, it is advantageous that any oxidizing compounds used be completely reduced before these new monomers are added. For example, in a system using titanium tetrachloride, in which titanium tetrachloride is reduced and thereby oxidizes an aluminum alkyl compound, and the resultant product is used to catalyze polymerization, it is desirable to use excess aluminum alkyl compounds to completely deactivate the titanium tetrachloride. If the oxidizing compound is not completely reacted, it will react with some of the metal monomer and thereby decrease the yield of polymeric material.

While certain features of this invention have been described in detail with respect to various embodiments thereof, it will, of course, be apparent that other modifications can be made within the spirit and scope of this invention, and it is not intended to limit the invention to the exact details shown above, except insofar as they are defined in the following claims.

The invention claimed is:
1. A new compound containing metal and ether groups therein, having the formula:

$$X-M-CR_2-Z-R'$$

wherein X is a group selected from the class consisting of R' and —$CR_2$—Z—R' groups, R is hydrogen, R' is a hydrocarbon radical free of acetylenic groups and having no more than 10 carbon atoms therein, M is a metal selected from the class consisting of beryllium, and magnesium, and Z is selected from the class consisting of an oxygen atom and divalent groups each having at least one ether oxygen therein and the remainder of each of said groups being hydrocarbon free of acetylenic groups and having no more than 14 carbon atoms therein.

2. Di-(beta-vinyloxy-ethyl)-beryllium.

References Cited by the Examiner

UNITED STATES PATENTS

| | | | |
|---|---|---|---|
| 1,938,642 | 12/1933 | Runyan | 260—2 |
| 2,573,049 | 10/1951 | Olson | 260—448 |
| 2,699,457 | 1/1955 | Ziegler et al. | 260—448 |
| 2,744,074 | 5/1956 | Theobald | 260—2 |
| 2,788,325 | 4/1957 | Meyers et al. | |
| 2,826,598 | 3/1958 | Ziegler | 260—448 |
| 2,835,689 | 5/1958 | Ziegler | 260—448 |

FOREIGN PATENTS 548,183   9/1956   Italy.

OTHER REFERENCES

Bahr et al.: Chem. Ber. 88, pp. 251–264 (1955).

LEON ZITVER, *Primary Examiner.*

ROGER L. CAMPBELL, ABRAHAM H. WINKELSTEIN, *Examiners.*

W. I. ANDRESS, J. C. LANGSTON, B. HELFIN,
*Assistant Examiners.*